United States Patent [19]

Giannini

[11] Patent Number: 4,671,486
[45] Date of Patent: Jun. 9, 1987

[54] MAGNETIC VALVE ACTUATOR

[76] Inventor: Gabriel Giannini, 51555 Madison St., Indio, Calif. 92201

[21] Appl. No.: 877,457

[22] Filed: Jun. 23, 1986

[51] Int. Cl.⁴ ...................... F16K 35/06; F16K 31/08
[52] U.S. Cl. ........................................ 251/65; 251/89; 251/267
[58] Field of Search ................ 251/65, 129.01, 129.11, 251/266, 267, 326, 327, 328, 329, 89; 137/384.2

[56] References Cited

U.S. PATENT DOCUMENTS

| | | | |
|---|---|---|---|
| 1,823,006 | 9/1931 | Sovpal | 137/384.2 |
| 2,289,574 | 7/1942 | Carlson | 251/65 |
| 3,938,779 | 2/1976 | Benjamin | 251/327 |
| 4,232,695 | 11/1980 | Roberge | 251/65 |
| 4,274,444 | 6/1981 | Ruyak | 251/65 |
| 4,284,262 | 8/1981 | Ruyak | 251/65 |
| 4,296,912 | 10/1981 | Ruyak | 251/65 |
| 4,327,892 | 5/1982 | Ruyak | 251/65 |
| 4,384,703 | 5/1983 | Ruyak et al. | 251/65 |
| 4,390,038 | 6/1983 | Salvato | 251/89 X |

Primary Examiner—A. Michael Chambers
Assistant Examiner—John C. Fox
Attorney, Agent, or Firm—Charmasson & Holz

[57] ABSTRACT

A valve actuator which allows complete isolation, controlled torque actuation, and tamperproof operation of valve by incorporating a magnetic coupling. An actuator cap is shaped to fit over a sealed valve stem. Permanent magnets are attached to the valve stem and actuator cap. The magnets provide a magnetic coupling between the actuator and valve stem and across a static non-magnetic bulkhead. The actuator cap is not physically attached to the valve and can be manually decoupled. The magnetic coupling and decoupling eliminates the need for a dynamic valve stem seal and the corresponding high sealing loads. Decoupling prevents accidental or unauthorized actuation. Safety is also enhanced by elimination of the dynamic seal. New magnetic materials can now provide high torque operation if needed for high pressure applications.

5 Claims, 2 Drawing Figures

U.S. Patent  Jun. 9, 1987  4,671,486
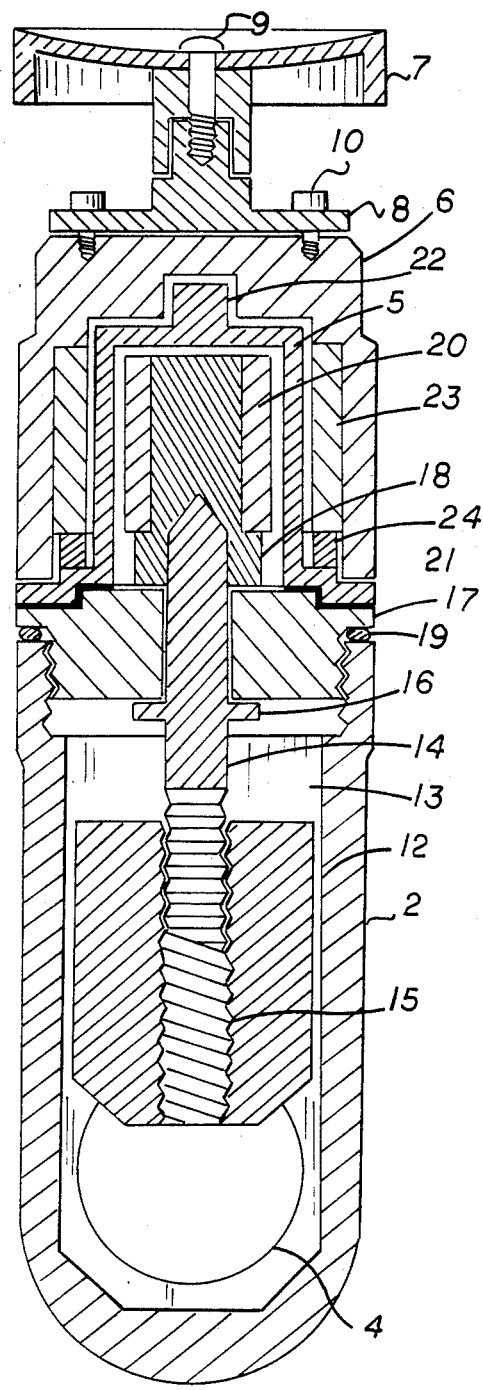
FIG. 2
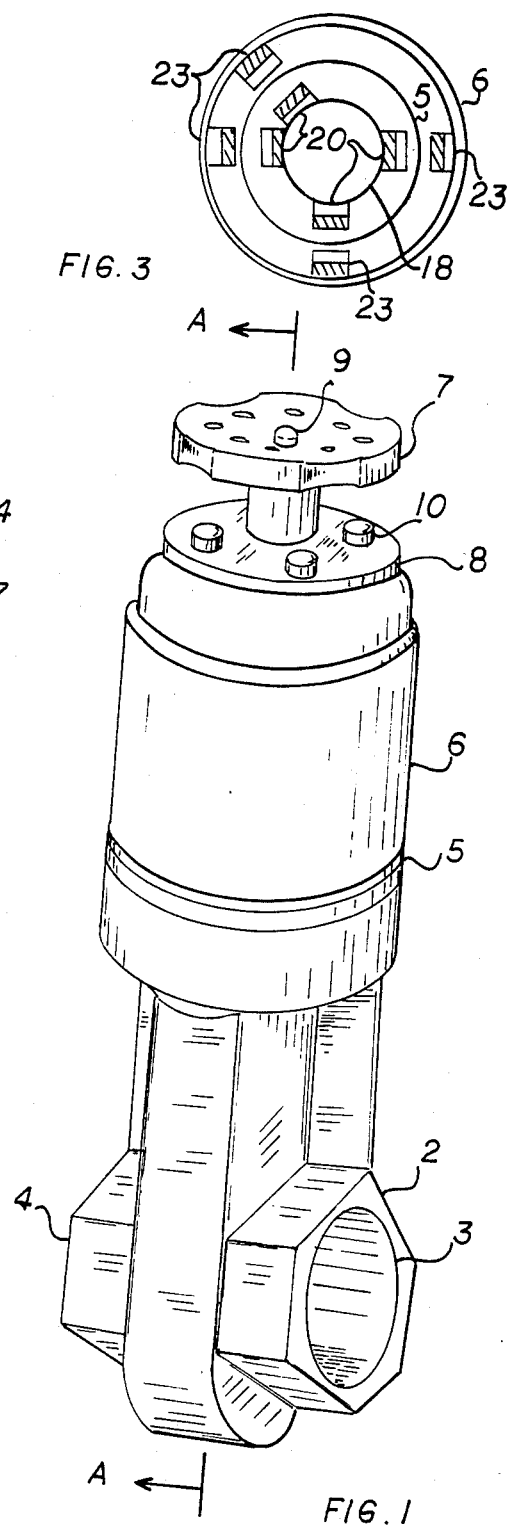
FIG. 3
FIG. 1

MAGNETIC VALVE ACTUATOR

FIELD OF THE INVENTION

This invention relates to fluid valves and actuators. It also relates more specifically to the control of fluid valves.

BACKGROUND OF THE INVENTION

Although fluid valves have been developed and improved over many decades, no one type of valve is appropriate for all types of service. A variety of valve seats, flow obstruction geometries, actuators, seals and valve bodies have evolved to match a variety of fluid control needs. The type of need that this invention was specifically directed to meet is the need to control leakage in the mechanical operating means when corrosive, poisonous or high pressure fluids are present. However, the invention also has other applications where very high reliability, safety and integrity of operation is required.

All valves require seals to prevent external leakage. Normally, this requires sliding and/or rotating seals at the valve stem. This dynamic seal, if it does not operate properly, is the primary cause of external fluid leakage. The valve stem is normally the only non-fluid opening in the valve body, allowing actuation and control of the fluid obstruction attached to the valve stem. If the valve is needed for high pressure service, this body opening and seal becomes critical. Seal forces must be increased to withstand the high fluid pressures. At the same time, seal forces cannot be increased too much as this precludes a restricting reasonable torque from actuating the valve. The high pressure also creates high forces at the valve seat, further increasing needed actuating torque. Torque requirements become critical when the valve is located in areas where even torque limitations occur, cannot be applied, such as in restricted access areas or underwater or during emergencies.

In addition to these design constraints and tradeoffs, seal wear is accelerated at higher seal loadings, leading to premature failure and/or increased torque requirements. Increased friction can actually cause seizure of "freezing" of the valve. Over torque applied to free these valves can further damage the valve.

Cost of high pressure valves is also impacted because of the precision manufacture, machining and assembly required for these seals and components. Very smooth surface finish on sealing surfaces, a high degree of quality control, precise dimensional and out of roundness tolerances and limited axial throw is required, increasing cost over and above the direct increase in strength requirements of the high pressure.

Reliability of high pressure valve is also more critical than low pressure valves. Failure of a low pressure valve to stop flow may be addressed by several alternatives, i.e.: opening the line and capping the source, pinch off of a line, or on-line repair of the valve (with fluid loss). Failure of a very high pressure valve to close or leakage at the stem seal is much more serious. Opening the line and capping the source may not be possible due to excessive forces required. Pinch off of a line is only possible with deformable (thin wall) tubing or piping. If the fluid is toxic or polluting, very high valve reliability becomes a critical design requirement rather than a design concern. Some intregral containment of dangerous fluids is achieved with the use of flexible diaphragms or bellow replacing the seal or stuffing box. However, these means reduce the motion of the stem controlling the valve and have life limited by metal fatigue.

Prior art attempting to meet this need has led to (1) sealed valves which fully enclose the valve stem actuator and valve, (2) a change in the type of valve to be used which does not require external control/actuation or can be simply controlled, (3) over powering actuators for high torque loads, or (4) use of flexible metal bellows.

An example of the enclosure approach is an electric motor or solenoid actuator which is exposed to the control fluid at the high pressures. Control is accomplished by electrical signals from outside the pressure cavity. Electrical leads do not rotate or move transversely and static seals can be used. The difficulty with this approach is that the actuator may not be compatible with the control fluid. Even with compatible fluids, rapid changes in fluid pressure and temperature may cause the exposed actuator to fail. Because the pressure vessel is now enclosing the entire actuator as well as valve, the weight of the valve goes up dramatically. Maintenance and off line repair costs are also made more difficult. Reliability of external electric power source can also be a problem. Finally, the electrical leads are frequently subject to damage during installation or maintenance of the heavy valve.

An example of the change in valve type is a poppet or check valve. A check valve requires no external control, but is capable of stopping flow in only one direction, not proportional control or dead tight shutoff. A poppet valve can be remotely actuated (outside the pressure enclosure) by solenoids or magnets. However, it is also limited in proportional fluid control ability and dead tight shutoff.

An example of the overpowering approach is geared electrical motors or hydraulic actuators. Very high seal loads and torque are accepted and overpowered by large actuators. However, this approach does not cure excessive cost, seal wear and other problems previously discussed while creating a very large and heavy valve.

All of these prior art approaches have limited application. All which allow proportional control involve permanent actuators adding weight and cost. Those lighter in weight do not have proportional control ability. None allow normal proportional operation without structural attachment of the actuator, exposing the actuator and valve to tampering or vandalism. Bellows and diaphragms are not usable at high pressures and have limited life.

Magnetic couplings have been used in rotary drive applications for many years. Until recently magnetic couplings were limited to low torque operation of small specialty pumps or other similar applications. Development of rare earth magnetic couplings now allows higher torque levels. They contribute complete fluid integrity while concurrently reducing the torque.

SUMMARY OF THE INVENTION

The principal and secondary objects of the invention are:
to provide a leak-proof valve;
to provide a reliable control valve actuator;
to eliminate the need for valve stem dynamic seals;
to maintain adjustable control valve capability;
to minimize valve size and weight;
to minimize cost of valves;

to provide two-piece construction without structural actuator attachment; and to prevent vandalism or tampering.

These and other objects are achieved by attaching permanent magnets to a rotating non-transversing valve stem, static sealing of the valve stem with a non-magnetic material and providing a rotatable cap over the exterior of the static seal. Magnetically coupled to the valve stem magnets are other magnets attached to the rotatable cap. The use of permanent magnets assure reliable, repeatable actuation; the static seal eliminates the need for dynamic seals; the infinitely adjustable rotational position maintains proportional control capability; size and weight are reduced by eliminating the dynamic seal. Two-piece construction and magnetic coupling eliminates the need for physical attachment allowing easy removal and tamperproof design.

BRIEF DESCRIPTION OF THE DRAWINGS

FIG. 1 is a view of a valve and actuator;

FIG. 2 is a cross-sectional view of a valve and actuator; and

FIG. 3 is a diagramatical illustration of a coded magnet coupling arrangement.

DESCRIPTION OF THE PREFERRED EMBODIMENT OF THE INVENTION

Referring now to the drawings, FIG. 1 is an overall view of a gate valve and magnetic actuator. The figure shows a valve body 2, with a fluid inlet port 3. The edge of the outlet port 4 is also visible in this view. The valve body extends around the valve stem (not seen in this view) towards a non-magnetic pressure cap or bonnet 5, the edge of which is seen in this view. The non-magnetic pressure cap 5 statically and hermetically seals the valve body 2 except for inlet port 3 and outlet port 4. In close proximity, but not structurally attached to non-magnetic pressure cap 5, is actuator cap 6. This actuator cap 6 can be rotated around non-magnetic pressure cap 5. A cap handle 7 is provided for easily rotating and removing actuator cap 6 from non-magnetic cap 5. Cap handle 7 is attached to handle bracket 8 by cap screw 9. Handle bracket 8 is attached to actuator cap 6 by bracket screws 10.

FIG. 2 shows a cross-section A—A of valve. The valve body 2 has 3 ports: an inlet port (not visible in cross section), an outlet port 4, and a valve stem port 11. Outlet port 4 is partially blocked by flow obstruction or gate 12. Gate 12, traverses passage 13 when not blocking flow to outlet port 4. Gate 12 is moved in and out of passage 13 by valve stem 14 which is threaded to engage gate threads 15. Valve stem 14 is prevented from translation by land 16 which is adjacent to guide 17. Guide 17 is threaded into valve stem port 11. The valve stem 14 protrudes past guide 17 engaging retainer 18 which also prevents translation of the valve stem. O-ring 19 seals external leakage from between guide 17 and valve stem port 11. Permanent rare earth valve stem magnets 20 are attached to retainer 18 which is attached to valve stem 14. A non-magnetic pressure cap 5 is bonded to guide 17 in this configuration. The pressure cap exterior is generally smooth and cylindrical. A first and second cylindrical lands 21 and 22 acting as bearing for the actuator cap 6 are also included on pressure cap 5.

An actuator cap 6 is coaxially placed over the pressure cap 5, but is not attached to it. Attached to the interior cavity of the plastic actuator cap 6 are rare earth cap magnets 23. The actuator cap interior is generally cylindrical, with surfaces matching lands 21 and 22. A spacer ring 24 is shown attached to the pressure cap 5 acting as an additional land, but also as a dynamic seal and bearing. Spacer 24 may also be serrated to allow fixed position or one way rotation unless actuator cap 6 is pulled outward disengaging the serrated surface. Handle bracket 8 is attached to the actuator cap 6 by bracket screws 10. Cap handle 7 is attached to the bracket by cap screw 9.

The actuator cap 6 can be easily removed by pulling away from the valve body 2 with a force sufficient to overcome the magnetic coupling force between the permanent magnets 20 and 23 plus any contact friction. The valve is tamperproof in that it cannot be operated without the removed actuator or similar magnetic device without damaging or disassembling the valve. The static seal and pressure cap 5 prevent contamination of the fluid being controlled, or the environment. The static seal design allows very high pressures to be tolerated with no increase in actuation torque. Actuator cap 6 rotation corresponds exactly to valve stem 14 rotation allowing infinitely adjustable control.

The materials of construction can be low conductivity stainless steel for the pressure cap 5 or other parts, or plastic. Magnets may be neodymium-iron or samarium-cobalt which allow torque ratings approximately three times that of ceramic permanent magnets. These magnetic materials also resist demagnetization.

As illustrated in FIG. 3, the polarity and alignment between the valve stem magnets 20 and the cap magnet 23 can be coded to key each actuator cap to a specific valve for security purpose. The azimuth, polarity and axial position of each magnet can be used in devising a multitude of keying combinations. This feature may be particularly applicable to laboratory valves used to control flow of highly toxic fluid or the progress of very sensitive experiments. The actuation cap 6 thus acts as a removable coded key to operate the valve by magnetic induction into the ferric elements 20 coupled to the valve stem 14 (the word ferric being used here to qualify any magnetically inductive element). The improvement is not limited to rotational actuators, but could be applied to other forms of flow obstruction operated by axial or lateral translation as well. It should also be understood that solenoids could be used in lieu of or in combination with magnets.

While the preferred embodiment of the invention in various configurations has been described, many other embodiments, sizes and configurations may be devised without departing from the spirit of the invention and the scope of the appended claims.

What is claimed is:

1. In combination with a fluid valve housed in a rigid enclosure having an inlet port, and outlet port and an operable flow obstructor between said ports, a leak-proof actuator which comprises:

a ferric element coupled to said flow obstructor;

a non-magnetic rigid barrier integral with said enclosure in the area proximate to said ferric element;

a magnet key outside said rigid enclosure for actuating said flow obstructor across said barrier;

wherein said ferric element comprises a plurality of first magnets arranged in a specific random pattern; and said magnet key comprises a plurality of second magnets arranged in a array complementarily matching said specific random pattern to create a magnetic couple between said ferric element and said key sufficient to operate said flow obstructor only if all of said first magnets are in a coupled arrangement with all of said second magnets.

2. The combination claimed in claim 1, wherein said flow obstructor comprises a rotating stem;
   said plurality of first magnets are concentrically distributed on the periphery of said stem;
   said rigid barrier is generallly cylindrical in shape and coaxial with said stem.

3. The combination claimed in claim 2, wherein said plurality of first magnets comprises magnets having a random axial distribution around the periphery of said stem.

4. The combination claimed in claim 2, wherein said plurality of first magnets comprise magnets having a random azimuthal distribution on the periphery of said stem.

5. The combination claimed in claim 2, wherein said plurality of first magnets comprises magnets having a random polarity distribution.

* * * * *